Sept. 1, 1953  F. BUSEMANN  2,651,016
DIRECT CURRENT ELECTRIC POWER TRANSMISSION SYSTEM
Filed March 14, 1952  2 Sheets-Sheet 2

Inventor
*Felix Busemann*
By *Ralph B. Stewart*
Attorney

Patented Sept. 1, 1953

2,651,016

UNITED STATES PATENT OFFICE 2,651,016

DIRECT CURRENT ELECTRIC POWER TRANSMISSION SYSTEM

Felix Busemann, Greenford, England, assignor, by mesne assignments, to E. R. A. Patents Limited, Leatherhead, England, a body corporate of Great Britain Application March 14, 1952, Serial No. 276,505
In Great Britain March 22, 1951

3 Claims. (Cl. 321—14)

This invention relates to high voltage direct current electric power transmission systems of the type in which valve converters connected in double path bridge arrangement serve to rectify alternating current from a mains supply transformer so as to provide direct current for the transmission line, and further valve converters connected in a corresponding manner at the far end of the line serve to invert the direct current and provide alternating current at the desired point. The invention is particularly concerned with the protection of the inverting installation for such a transmission system.

In such systems, power is transmitted over the direct current line at voltages of the order of 100,000 volts with power of the order of 100,000 kilowatts. The valve converters are usually of the mercury vapour type connected in three-phase bridge arrangement, both at the rectifying end and also at the inverting end. Thus each set comprises three pairs of converters connected anode to cathode, one pair for each transformer phase.

In general, a two-conductor line with the mid-point earthed is employed, so that there is one set of six converters between one conductor and the earthed point, and a further set between the earthed point and the other conductor. Each set is fed from a three-phase transformer with each phase of the secondary winding connected to the interconnected anode and cathode of one pair of converters. Similar installations are employed for both rectifying and inverting processes and at the latter installation the direct current power from the line is converted into alternating current output by timing the commutation from converter to converter by means of a local alternating current supply system. The direct current from one line conductor passes through one of the converters at the positive pole, then flows through the transformer and then through one of the converters on the negative side to the other line conductor. In passing through the transformer, the current flows in opposition to the voltage of the local alternating current supply and it is in this way that power is absorbed into the alternating current system.

In view of the fact that the inverter carries current mainly during the negative half of the voltage wave, it may be regarded as a rectifier with the ignition delayed by nearly 180 electrical degrees. It is necessary that each commutation of the inverter current must finish by the moment at which the voltage waves of two consecutive phases intersect on the negative side; this is 180 electrical degrees later than the point of ignition of a rectifier without phase control. For this reason the inverter cannot be operated with more than 180 electrical degrees phase delay after the point of ignition of the uncontrolled rectifier. In practice the inverter can only be operated reliably with a phase delay of something less than this 180 degrees, since time has to be allowed for commutation and deionization. Therefore, an advance in ignition is required at some angle before the point of intersection of the negative half waves of the two phases in question, and in practice such an angle of advance of the ignition may be about 20 to 30° for normal operation.

During the time from the ignition of the inverter valve until the intersection point of the voltage waves of the two phases is reached, commutation of the current has to be effected, and this takes a time which depends on the current, the reactance in the circuit and the voltage between the two phases in question, that is to say, the commutating voltage. After the current in one valve has reached zero, some time is necessary for deionizing the valve before it can withstand the positive voltage to which it is subjected after passing the point of intersection of the voltage waves of the two phases.

A sudden reduction of the alternating current busbar voltage may occur due to distant faults in the alternating current system supply from the inverter and such voltage reduction increases the time of commutation and may even cause commutation failure if there is not sufficient time available for deionization. If this occurs the current is thrown back to the valve in the preceding phase, and during the next cycle or so the counterelectromotive force of the inverter is in the region of zero. The result is a rapid rise in the current drawn from the line usually accompanied by fluctuations of the line voltage, the magnitude of which depends on the capacitance of the line, the inductance of the smoothing coil and the rectifier characteristic.

It is the object of the invention to reduce or overcome such a fault or disturbance of which, as already stated, rapid rise in the current drawn from the line and fluctuations of the line voltage are symptoms, thereby enabling the inverter to continue working with increased safety of commutation and with some counterelectromotive force in the main circuit.

According to the invention, therefore, use is made of the sudden rise of current in the line in obtaining rapid action of the protective device. A voltage corresponding to the rate of rise of the current is available at the terminals of the smoothing conductor connected in the line conductor and this voltage may be employed to energise a relay to operate the protective device. If that voltage exceeds a predetermined value, the protective device is energised to adjust the phase angle of the grid impulses to the converters in order to restore normal conditions in the system. This may be done, for example, in the case of electronic controllers by altering the grid bias, or in the case of grid controllers that have saturated reactors acting as magnetic amplifiers or transductors by altering the magnetization.

When such protective or tripping device is employed and responds to the rate of rise of current from the line to readjust the ignition angle, in normal operation, the inverter can operate at a small angle of phase advance and would demand only a small amount of reactive power. However on the occurrence of faults in the system such as reduction of the alternating current voltage, or of faults in the inverter itself such as commutation failure, the protective relays would automatically increase the phase advance angle of the inverter from a value of, for example 20 to 30° which is good for minimum reactive power during normal operation, to a value of, for example 40 to 50° which would enable the inverter to recover the normal circulation of current among the converters of the inverter. Under the latter conditions, of course, the demand for reactive power is increased and the counterelectromotive force is less than that during normal operation but greater than that in an inverter which is not equipped with protective devices in accordance with the invention and which after the fault would have no counterelectromotive force at all.

To make this clearer an example may be considered where the phase advance angle is 25° during normal operation. In this case the counterelectromotive force is cos. 25° of 100% which is 91% of the ceiling voltage of the inverter. If the automatic control device increases the phase advance angle up to 45°, the counterelectromotive force would be cos. 45° of 100%, which is 71% of the ceiling voltage, or 78% of the value during normal operation. Suppose the fault had been caused by a drop of 20% in the alternating voltage, the counterelectromotive force after automatically increasing the phase advance angle, would be cos. 45° of 80%, that is, 56.5% of the ceiling voltage under normal operating conditions, which is 62% of the counterelectromotive force under normal operating conditions.

It may be, of course, that such a drop in the alternating voltage may be caused, for example, by a fault in the alternating current system which is likely to clear itself within a second or so, and it is desirable after the alternating voltage has thus recovered to its normal value to re-set the phase advance angle of the inverter to the normal value in order to reduce the reactive power demand. This may be achieved by the use of a timing relay which operates after a definite time interval to restore the phase advance angle to its normal operating value. This time interval should be somewhat longer than the time of clearing the fault by the protective apparatus used in the alternating current system.

The voltage available across the terminals of the smoothing inductor corresponding to the rate of rise of the line current may be utilised by provision of a second winding on the core of the inductor so that a corresponding voltage is induced in this second winding which can be used directly. Alternatively, however, a small voltage transformer of the instrument type can have its primary winding connected across the terminals of the smoothing inductor so that the voltage induced in its secondary winding can be used directly. A voltage obtained in either of these ways, however, contains ripple components and a small amount of electrical inertia may be introduced by means of series resistance and shunt capacity to render the arrangement just sufficiently insensitive to cause it to ignore the normal ripple component but to respond when the voltage across the smoothing inductor departs considerably from its normal value.

An installation in accordance with the invention is illustrated by way of example in the accompanying drawings, in which.

Figure 1:
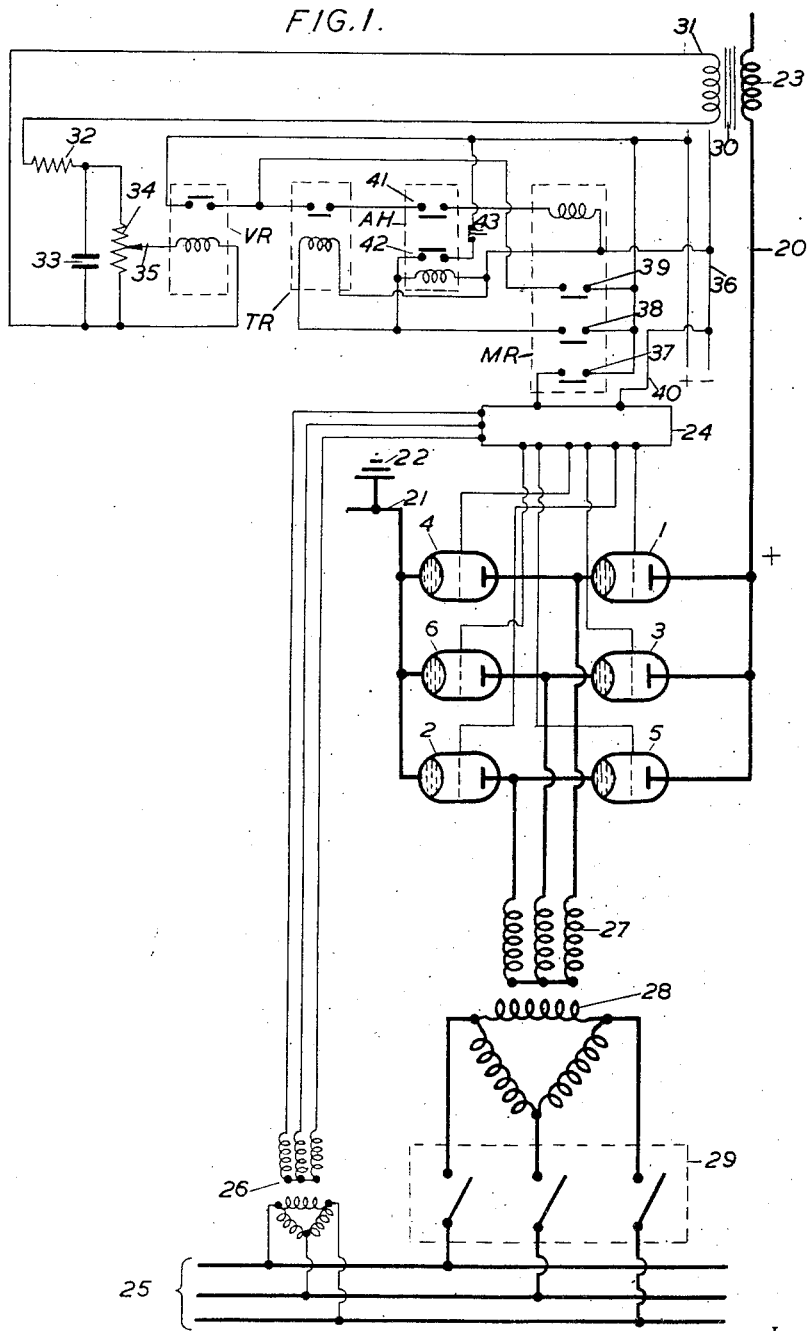
Figure 1 shows a complete inverter installation.

The inverter installation is situated at one end of a two-conductor transmission line of which only the positive conductor 20 and the mid-point constituted by a busbar 21, earthed at 22 are shown. The whole installation is duplicated between the mid-point and the negative conductor. The direct current arriving by way of the positive conductor 20 is smoothed by an inductor 23 and is inverted by means of mercury vapour converters 1 to 6, which are rendered conductive in the order of their reference numerals by means of positive grid impulses controlled by a controller unit 24. The impulses are timed by means of local three-phase alternating current mains 25, which supply the controller 24 by way of an auxiliary transformer 26. The currents from the converters flow through the star-connected secondary winding 27 of a main transformer 28 connected to the supply mains 25 through a circuit breaker 29. The grid impulses are so timed that the current in the secondary winding of the main transformer 28 flows in opposition to the voltage of the supply mains 25 so that the power from the direct current mains is absorbed into the alternating current mains.

The faults already described cause a sudden rise in the direct current flowing in the line conductor 20, and induce a voltage in the smoothing inductor 23. The core 30 of this inductor is provided with a second winding 31 in which a corresponding voltage is induced. The normal ripple is largely eliminated by the inclusion of a series of resistance 32 and a shunt capacity 33 in the manner already described, and an operating voltage is then tapped off from a potentiometer resistance 34 by way of a tap 35. This voltage is applied to the coil of a relay VR serving to close its contacts, which are normally open. This completes a circuit from direct current mains 36 through normally closed contacts of two further relays TR and AH to the coil of a main relay MR. This relay has three pairs of contacts 37, 38 and 39, all of which are normally open and which are closed when the coil is energised by the closing of the contacts of the relay VR.

Figure 3:
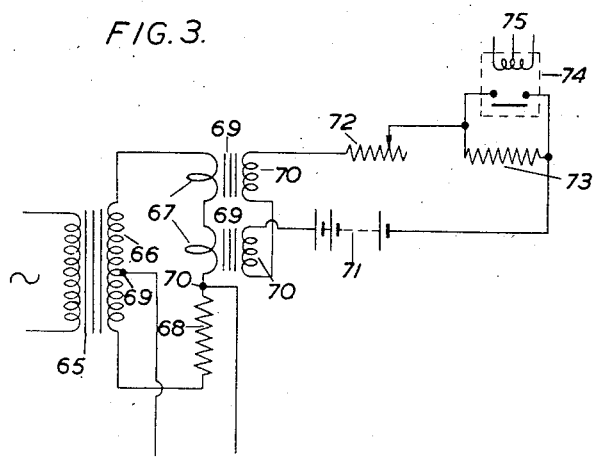
Figure 3 shows part of the grid impulse control circuit.

Closing of the contacts 37 completes a circuit from the positive direct current line to the controller 24, a negative return lead 40 being provided. This operates the protective device as shown in Figure 3 and provides the necessary advance of the phase angle of the grid impulses. Closing of the contacts 39 completes a holding circuit to the coil of the relay MR, which passes through the normally closed contacts of the relays TR and AH so that the relay MR is kept energized even if relay VR opens its contacts.

Closing of the contacts 38 completes a circuit through the coil of the timing relay TR and also through the coil of the anti-hunting relay AH. The relay TR is set with a time delay so that after its coil has been energized for a predetermined time interval, its normally closed contacts open. This interrupts the circuit to the coil of the relay MR and opens contacts 37, 38 and 39, thus restoring the phase angle of the grid impulses to its normal value and also de-energising the relay TR to close its contacts again. If there is still sufficient voltage across the smoothing inductor 23, the relay MR will then be re-energised and the sequence of operations will then be repeated. This may occur a number of times and since a continuance of this hunting is undesirable, the anti-hunting relay is designed to come into operation after its coil has been energised, although intermittently, for a predetermined time interval corresponding to a number of operations of the relay MR. When the relay AH operates, it opens its normally closed contacts 41 so as again to interrupt the circuit to the coil of the relay MR and at the same time closes a normally open pair of contacts 42, which complete a holding circuit to its coil by way of a push button 43. The relay AH is thus left in the energised condition so that the relay MR cannot be re-energised and the protective device is thus put out of action until it is restored by manual operation of the push button 43.

Figure 2:
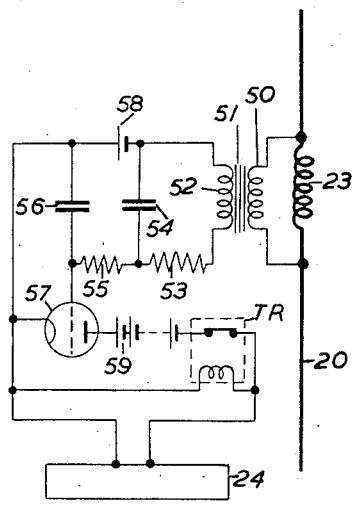
Figure 2 shows a modified form of protective device.

In the modified circuit arrangement shown in Figure 2, the smoothing inductor 23 has the primary winding 50 of a voltage transformer 51 connected across its terminals. The secondary winding 52 is provided with series resistance 53 and a shunt capacity 54 in the same manner as shown in Figure 1. In addition, a resistance 55 is connected in series with a capacity 56, the mid-point between these being connected to the grid of a gas-filled triode 57. Grid bias is provided by means of a battery 58 and when sufficient voltage appears across the smoothing inductor 23, the anode circuit of the valve 57, which includes a battery 59, is rendered conductive. The circuit includes normally closed contacts of a timing relay TR and passes to the controller 24 so that when this circuit is rendered conductive, the phase angle of the grid impulses is advanced. In parallel with the controller 24 is the coil of the relay TR so that when the anode circuit has been conductive for a predetermined interval, the relay TR is energised to open its contacts and interrupt the circuit. This operation is repeated as long as sufficient voltage is present across the smoothing conductor 23, and anti-hunting arrangements will normally be provided as shown in Figure 1. It will be understood that the triode 57 replaces the relay VR shown in Figure 1.

Figure 3 shows part of the phase control circuit of the controller 24. The supply is by way of a transformer 65 having a centre tapped secondary winding 66. The secondary winding supplies a circuit which includes a pair of saturable reactors 67 in series with a resistance 68. Leads are taken off from the centre tap 69 of the secondary winding 66 and the mid-point 70 between the reactors 67 and the resistance 68. The phase of the voltage between the points 69 and 70 in relation to that of the primary winding of the transformer 65 depends on the relative magnitudes of the reactors 67 and the resistance 68 so that by varying the former, the relative phase angle can be shifted. The two reactors have cores 69 magnetised by means of direct current windings 70 connected in opposition and energised by way of a battery 71 connected in series with a variable resistance 72 and a fixed resistance 73. By varying the resistance 72 so the current flowing in the direct current windings 70 is controlled and the phase angle of the voltage between the points 69 and 70 is correspondingly controlled. The resistance 73 is arranged to be short-circuited by the contacts of a relay 74, the coil 75 of which is energised by the circuit shown in Figures 1 and 2. Thus when the relay MR of Figure 1 is energised or the triode 57 of Figure 2 is rendered conductive, the relay 74 closes its contacts to short-circuit the resistance 73. This provides an abrupt increase in the current in the windings 70 with a corresponding change in the phase angle of the voltage between the points 69 and 70. This is then used to provide a corresponding change in the phase angle of the grid impulse system, which is not shown, but which is well-known.

I claim:

1. In an inverting installation for a high voltage direct current electric power transmission system, the combination of a pair of direct current terminals, a line conductor connected to one of said terminals, a smoothing inductor connected in said line conductor, three pairs of grid-controlled current converters connected anode to cathode between said terminals, grid control means for said converters, a three-phase power transformer having two windings, a three-phase alternating current supply, the phase connections of the first winding of said transformer being connected between mid-points of said pairs of current converters, the phase connections of the second winding of said transformer being connected to said alternating current supply, a relay, means responsive to voltage across said smoothing inductor for operating said relay and circuit means completed by said relay for adjusting the phase angle of impulses supplied by said grid control means.

2. An inverting installation according to claim 1, and also including a timing relay operative to interrupt said circuit means after a predetermined interval.

3. An inverting installation according to claim 2, and further comprising an anti-hunting relay operative to interrupt said circuit means after repeated operation of said first relay, a holding circuit for said anti-hunting relay energised by operation of said anti-hunting relay and push-button means connected in said holding circuit for manual interruption of said holding circuit.

FELIX BUSEMANN.

References Cited in the file of this patent

UNITED STATES PATENTS

| Number | Name | Date |
|---|---|---|
| 2,004,952 | Journeaux | June 18, 1935 |
| 2,026,358 | Petersen | Dec. 31, 1935 |
| 2,056,655 | Ehrensperger | Oct. 6, 1936 |
| 2,175,020 | Frohmer | Oct. 3, 1939 |
| 2,568,391 | Geiselman | Sept. 18, 1951 |